United States Patent [19]

Marwell et al.

[11] 3,777,266

[45] Dec. 4, 1973

[54] PROGRAMMABLE INTEGRATOR

[75] Inventors: Edward M. Marwell, Mount Kisco; Eugene P. Finger, Brewster, both of N.Y.

[73] Assignee: Curtis Instruments, Inc., Mount Kisco, N.Y.

[22] Filed: July 26, 1972

[21] Appl. No.: 275,329

[52] U.S. Cl. .................................. 324/182, 324/94
[51] Int. Cl. ........................ G09f 9/00, G01r 11/44
[58] Field of Search .............................. 324/182, 94

[56] References Cited
UNITED STATES PATENTS

| | | | |
|---|---|---|---|
| 3,613,002 | 10/1971 | Trenkler | 324/182 |
| 3,603,880 | 9/1971 | Brecker | 324/182 |

FOREIGN PATENTS OR APPLICATIONS

| | | | |
|---|---|---|---|
| 1,153,226 | 5/1969 | Great Britain | 324/182 |

*Primary Examiner*—Alfred E. Smith
*Attorney*—Dean S. Edmonds et al.

[57] ABSTRACT

A method and apparatus is disclosed for measuring the operational use of a physical system. The apparatus includes an integrator having a reversible coulometer including a bored tube made of a transparent or translucent material with a pair of electrodes connected to each end thereof. A transparent electrolyte is positioned in the bore between two columns of an opaque electrolytically platable metal. A pair of light sensitive elements, spaced from one another, are positioned on one side of the tube, and a source of light is positioned on the opposite side of the tube. At least one source of current having an amplitude which is a function of the use of the system being measured is connected to the electrodes of the coulometer through an interconnector plug. The plug includes a plurality of weighting resistors, one for each source of current, which appropriately adjust the relative contribution of each current source to the total current conducted through the coulometer. A new plug is connected between the coulometer and the current sources at the end of each integrating interval so that current conduction through the coulometer is reversed. The values of the weighting resistors may be varied from plug to plug to vary the effect that machine use has on the integrating interval.

14 Claims, 6 Drawing Figures

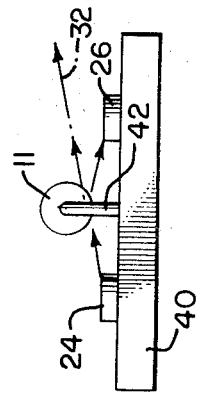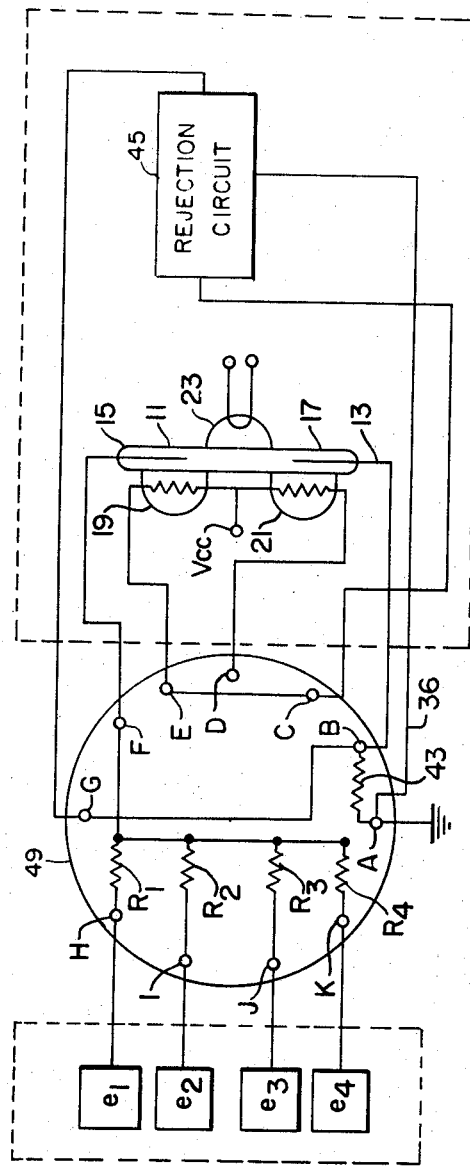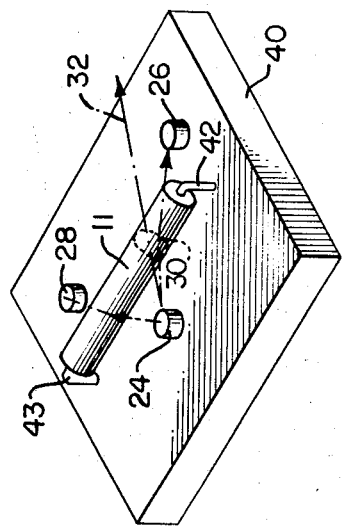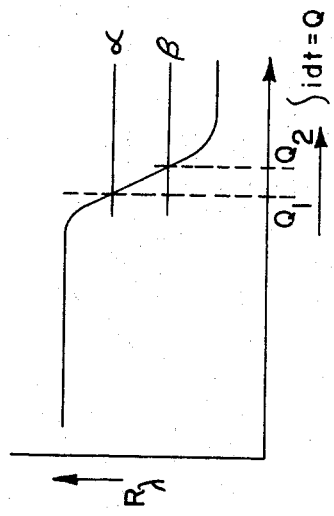

PROGRAMMABLE INTEGRATOR

BACKGROUND OF THE INVENTION

This invention relates to a method and apparatus for measuring the use of a system or portions thereof.

With the increased complexity of electrical and mechanical systems, such as, motor vehicles, computers, airplanes, and other such sophisticated equipment which operate on either a continuous or intermittent basis and which require preventive maintenance, the necessity of measuring the total length of time that the system has been in use, and equally important the degree or level of such use, has become increasingly important. For example, in the past the use of machines such as motor vehicles was measured on a rather crude basis, i.e., by means of an odometer. Such a measuring device indicates the total mileage traveled by the vehicle but fails to accurately show the level of use of the vehicle. Thus, if a motor vehicle is normally operated in heavy commuter traffic, the time during which the engine is running, the use of the clutch mechanism, the total number of engine revolutions, the use of the brake system, etc., cannot be adequately gauged by the number of miles the car has traveled since during a large portion of the operating time, the vehicle may have been in an idle state or moving at a slow pace. Because the odometer is not an accurate means for measuring the operational use of motor vehicles, manufacturers now recommend that the time for vehicle service be based on two criteria, namely, the number of miles traveled by the vehicle and the expiration of a predetermined calendar time interval. Neither of these criteria accurately reflect the use of a vehicle. Accordingly, with the increased complexity of motor vehicles due to fuel emission and safety requirements, a more accurate technique is needed for determining the use of such vehicles.

In order technological systems, preventive maintenance such as lubrication and periodic parts replacement is required. If the operational use of these systems can be adequately determined, the appropriate time for maintenance can be more precisely determined. This will result in a substantial economy of use of the device since the device will be serviced only at intervals determined by total machine usage.

Many mechanical and electrical timers and operating cycle timers are presently commercially available but they are typically too large and expensive to be incorporated into machines or machine subassemblies. In addition, these prior art timers are capable of timing only one operational function on an on-off basis. Thus, these prior art timers typically have no provision for measuring the use or level of use of a system on an analog basis nor do these prior timers have the capability of measuring the cumulative use of a plurality of subassemblies within the system.

It, therefore, is an object of this invention to provide a method and apparatus for measuring the operational use of a physical system.

SHORT STATEMENT OF THE INVENTIN

Accordingly, this invention relates to a method and apparatus for determining the use of a physical system. The apparatus includes an integrator including a reversible coulometer having a bored tube made of a nonconductive, transparent or translucent material through the ends of which extend a pair of electrodes. An opaque liquid metal capable of being electrolytically deposited is placed inside the tube in contact with the electrodes with the metal being separated by a gap filled with a transparent electrolyte. A pair of light sensitive elements spaced from one another are positioned to one side of the tube, and a source of light is situated on the opposite side of the tube. At least one source of current having an output which is a function of the level of use of a system or portion thereof is connected to the coulometer through an interconnecting plug. The plug includes a plurality of weighting resistors, one for each source of input current, which appropriately adjusts the contribution of each current source to the total current conducted through the coulometer. As current from the sources is conducted through the coulometer, the gap moves from one light sensitive element toward the other. When the gap reaches the other light sensitive element, light from the light source is passed through the gap to the element which then provides an output indicating that an integrating interval has been completed.

At the end of each integrating interval, a new plug is connected between the sources of current and the coulometer which plug reverses current flow through the coulometer.

The values of the weighting resistors can be varied from plug to plug to vary the effect that machine use has on the integrating interval. The variation of the values of the resistors from plug to plug not only changes the contribution of each current source to the total current being integrated but also changes the relative machine use required to complete an integration interval.

BRIEF DESCRIPTION OF THE DRAWINGS

Other objects, features, and advantages of the invention will become more fully apparent from the following detailed description, appended claims, and the accompanying drawings, in which:

FIG. 3 is a schematic diagram of the programmable integrator of this invention requiring only one source of supply voltage;

FIG. 4 is a graphical display of the variation of the light sensitive elements with the integral of the current passing through the coulometer;

FIG. 5 is a perspective view of an integrated circuit embodiment of the coulometer integrator of this invention; and FIG. 6 is an end view of the integrated circuit of FIG. 5.

DETAILED DESCRIPTION OF THE PREFERRED EMBODIMENT

Figures 1, 2:
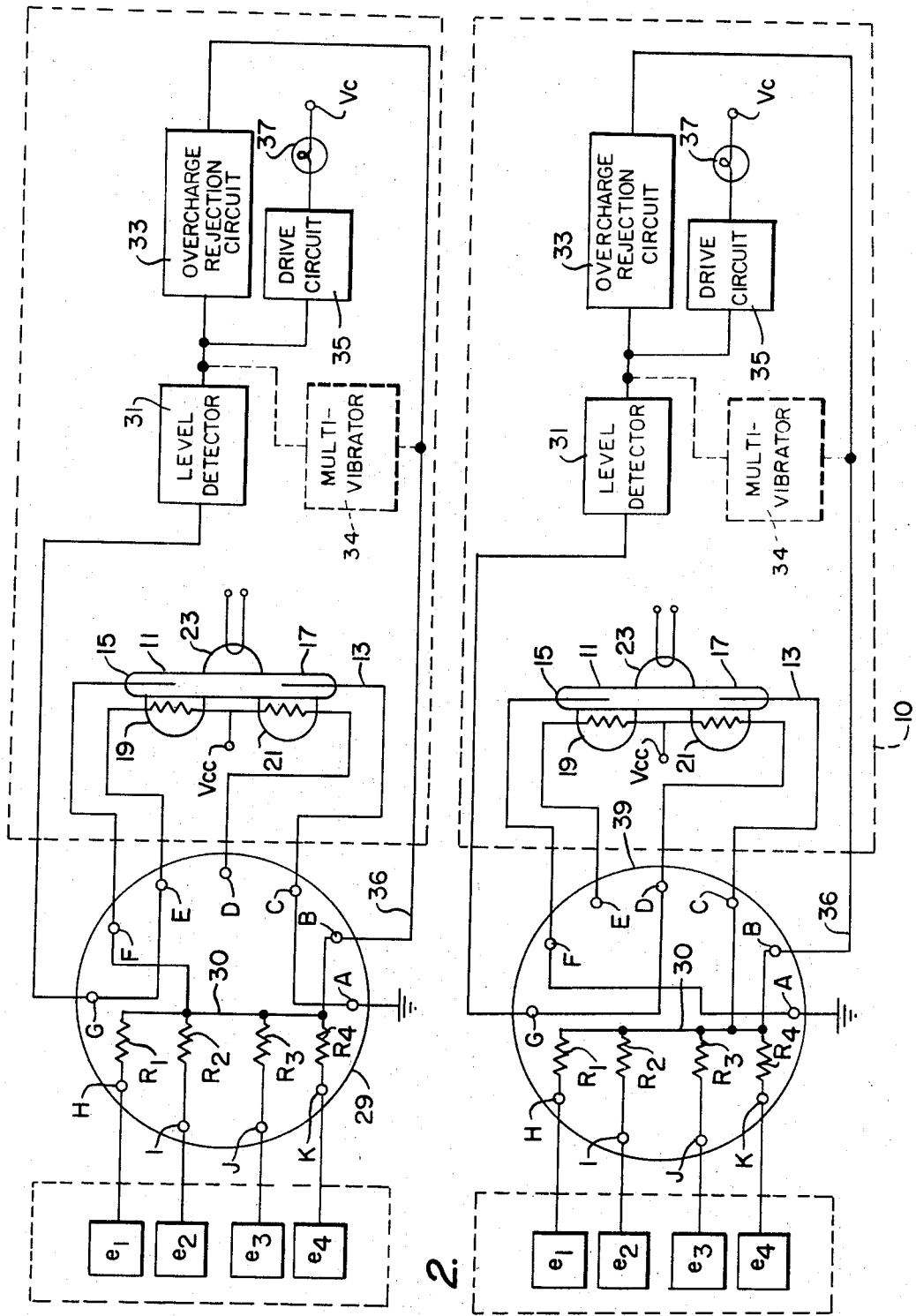
FIG. 1 is a simplified schematic diagram of the programmable integrator of this invention including a first interconnection plug.
FIG. 2 is a schematic diagram of the programmable integrator interconnected by a second plug for the next succeeding integrating interval.

Refer now to FIG. 1 where there is shown a simplified schematic diagram of the programmable integrator of this invention which includes a coulometer integrator circuit 10 and a programmed interconnection plug 29. The plug may be of any suitable size or shape but in the preferred embodiment is circular and has a plurality of male connector pins extending therefrom. The coulometer integrator circuit includes a plurality of female sockets to mate with the pins of the plug. A coulometer 11 is shown schematically in the integrator circuit and includes a pair of electrodes 13 and 15 secured to a tube 17 at each end thereof. As more completely described in U.S. Pat. No. 3,462,684 issued to Curtis Beusman and assigned to the common assignee herewith, the coulometer tube has a bore therethrough into which a platable liquid metal such as mercury is positioned. The mercury is formed in two columns which are separated by a suitable electrolyte. The electrolyte and tube are either transparent or translucent while the liquid metal is opaque. As is known in the art, the gap between the mercury columns formed by the electrolyte will move toward one of the electrodes when current is conducted through the coulometer. The direction and rate of movement of the gap is dependent upon the direction and level of current flow through the coulometer.

A pair of light sensitive elements 19 and 21 are positioned to one side of the coulometer tube 17 and are spaced from one another along the longitudinal axis of the tube. The light sensitive elements may be of any suitable type, such as, for example, photocells or phototransistors, but in the preferred embodiment, photocells are utilized. A source of light 23 is positioned on the side of the tube 17 opposite the elements 19 and 21. The light source may be of any suitable type such as a lamp, a photodiode, or ambient light. The light source 23 is connected to a source of voltage (not shown). The common terminals of the photocells 19 and 21 are each connected to a regulated source of voltage $V_c$ (not shown). The other terminals of the photocells 19 and 21 are connected to terminals E and D, respectively, of interconnection plug 29. The electrodes 13 and 15 of the coulometer are connected to terminals C and F, respectively, of the plug. Connected to terminal G is a level detector 31 having a large positive feedback. An example of such a circuit is a Schmitt trigger. The output of the Schmitt trigger 31 is connected to an overcharge rejection circuit 33 and an indicator drive circuit 35. The overcharge rejection circuit generates a signal which is either equal to or greater than the input signal to the coulometer. The output of the overcharge rejection circuit is connected via line 36 to terminal B of the interconnection plug 29. The lamp drive circuit 35 is simply a gate which permits current to flow from a source of supply voltage $V_c$, through a suitable indicator, such as a lamp 37 to ground.

The plug 29 includes a plurality of terminals designated by the letters A through K. Terminal A is connected to a reference potential, such as ground; terminals B through G connect the plug 29 with the integrator circuit 10; and terminals H through K connect plug 29 to the external signal sources $e_1$ through $e_4$. The external signal sources $e_1$ through $e_4$ are typically transducers, each of which derive a suitable output signal having an amplitude that is a function of the use of the particular portion of the system to which they are attached. Thus, for example, if the use of a car is being measured, source $e_1$ may be a thermocouple which measures engine temperature, source $e_2$ may be a tachometer which measures engine speed, source $e_3$ may be a strain gauge which measures the relative expansion and contraction of the engine block and $e_4$ may be a keyed switch which indicates on an on-off basis the number of times the engine has been turned on and off. While only four signal sources are illustrated, as many operational parameters of a system as desired may be measured depending on the complexity of the equipment being measured. It should also be understood that any suitable transducer element which generates an output that is a function of the use of the device with which it is associated may be utilized in this invention.

A plurality of weighting resistors $R_1 - R_4$ in plug 29 are each connected at one end to a corresponding transducer $e_1 - e_4$, via terminals H through K and are connected at their other ends to a common node 30 which, as shown, is connected through terminal F to electrode 15 of coulometer 17. The value of each resistor depends on the level of output voltage generated by its associated transducer and on the relative effect the portion of the system being measured by the transducer has in total system use. In the example, the output of the thermocouple source $e_1$ is substantially lower than the output of the tachometer source $e_2$ so the value of the resistance of resistor $R_2$ will be greater than resistor $R_1$. Thus the difference in the output levels of the thermocouple and the tachometer are compensated by the weighting resistors $R_1$ and $R_2$. Further, the effect of high temperature operation on engine life and repair may be greater than the effect of total engine revolutions or, vice versa. Accordingly, the resistors $R_1$ and $R_2$ are appropriately weighted according to engineering specifications to reflect the relative effect each measured parameter has on the engine or vehicle life.

As shown in the figure, terminal E is connected to terminal G so that photocell 19 is connected through terminals E and G to Schmitt trigger 31. The photocell 21 is connected to terminal D, but since it has no function when current is conducted from electrode 15 to electrode 13, the output of photocell 21 is left open circuited. Terminals A and C of the plug are interconnected so that electrode 13 of the coulometer is grounded.

In operation, the signals from the transducers $e_1$ through $e_4$ are conducted through the weighting resistors $R_1 - R_4$ of plug 29. The resulting currents are summed at node 30 and conducted through coulometer 11 from electrode 15 to electrode 13 and then to ground through terminal A. A current is conducted through the coulometer 11, the electrolytic gap moves toward electrode 15 from photocell 21 due to the plating action on electrode 13. When the gap becomes aligned opposite photocell 19, light from lamp 23 passes through the coulometer tube 11 and the electrolytic gap and impinges upon the photocell 19. The resistance of the photocell is thereby substantially reduced causing an increase in voltage to appear at the input to the Schmitt trigger 31. The Schmitt trigger then produces a step output function which actuates lamp driver 35 so that indicator lamp 37 is energized. At the same time overcharge rejection circuit 33 is energized and produces a voltage that is either equal to or greater than the input voltage at the electrode 15 of coulometer 11 but which is of opposite polarity thereto. This nullifies or reverses the input current to the coulometer so that current flow from electrode 15 to electrode 13 a stopped, thereby preventing the electrolyte from making contact with electrode 15 which might result in possible damage to the coulometer. The integrating interval is now completed and a new interval will not be initiated until plug 29 is replaced.

It is important that the electrolytic gap be situated in a predetermined position in the coulometer after photocell 19 is energized so that the integrating interval for the next cycle, i.e., the interval when the gap moves from photocell 19 to photocell 21, will require a constant and predictable quantity of current flow through the coulometer before the completion of the interval. If, for example, a reverse current is passed through the coulometer from electrode 13 to electrode 15 before the start of the next cycle, the gap would move closer to photocell 21 thereby reducing the quantity of current flow through the coulometer from the signal sources $e_1-e_4$ required to drive the gap to photocell 21. A solution to the problem of maintaining the gap opposite a photocell at the end of an integrating interval can best be explained in connection with FIG. 4. FIG. 4 is a graphical display of the variation of photocell resistance $R_\lambda$ with the total current passing through the coulometer, $\int dt$, as the electrolytic gap approaches a photocell. Initially before the gap reaches the photocell, the photocell resistance is very high. As the gap moves in front of the photocell, the resistance thereof decreases as shown. At the resistance level indicated by the line $\beta$ the Schmitt trigger is actuated while at the resistance level designated by the line $\alpha$, the Schmitt trigger is returned to its off state. It can be seen that a hysteresis band is established such that the total quantity of current passing through the coulometer can vary within the bounds $Q_1$ and $Q_2$ without disturbing the state of Schmitt trigger 31.

When the Schmitt trigger has been energized, i.e., after $Q_2$ coulombs have passed through the coulometer, a signal equal to or greater than the input signal at electrode 15 and of opposite polarity thereto is generated by overcharge rejection circuit 33. This signal is applied to the coulometer input electrode 15 to either nullify or reverse the current flow therethrough. If the current is nulled, the gap will remain in position opposite the photocell 19. However, if the current flow is reversed, the integral of the current passing through the coulometer will decrease. Hence, the gap will move back toward electrode 13, causing the resistance of photocell 19 to increase as shown by the graph of FIG. 4. When the resistance of the photocell reaches the $\alpha$ level, Schmitt trigger 31, lamp 37 and overcharge rejection circuit 33 are each deenergized. Thus, the reversing current is cut off, and current flow through the coulometer will pass from electrode 15 to electrode 13 due to the input current from the transducers $e_1-e_4$. It can therefore be seen that the gap will oscillate about a null point proximate the photocell 19 so that the maximum possible error due to drift of the gap is $Q_2 - Q_1$ coulombs.

If it is desired to have a rapid and uniform on-off oscillation of the lamp 37, i.e., a flashing indicator lamp, a one-shot multivibrator 34 may be connected to the input of coulometer 15 when the Schmitt trigger is actuated. The one-shot generates a signal much greater than the signal input from sources $e_1-e_4$ so that each time the resistance of the photocell goes from $R_\beta$ to $R_\alpha$ because of the reverse current generated by the overcharge rejection circuit 33, the one-shot is triggered to provide a current which drives the gap back toward photocell 19 and hence reduce the resistance of the photocell back to $R_\beta$. The reversing currents supplied by the overcharge rejection circuit and the one-shot cause the Schmitt trigger and hence lamp 37 to be alternately switched on and off.

After an integrating interval or cycle has been completed, the original input plug 29 is removed, and a new integrating interval is started by inserting a second plug 39 into the circuit as shown in FIG. 2. The second plug has a plurality of weighting resistors $R_1-R_4$ each being connected at one end to an associated input signal source $e_1-e_4$. The resistors are connected at their other ends in common to input electrode 13 of coulometer 11 through terminal C. The other electrode 15 is connected to ground through terminals F and A. Photocell 21 is connected to Schmitt trigger 31 via terminals D and G whereas photocell 19 which on the last cycle was connected to the Schmitt trigger is open circuited.

As before, currents from the signal sources $e_1-e_4$ are conducted through the weighting resistors $R_1-R_4$, respectively, and summed at node 30. The summation current is then conducted through the coulometer to ground. As the current is conducted through the coulometer, the gap thereof moves from photocell 19 toward photocell 21. After a predetermined number of coulombs have passed through the coulometer, the gap approaches photocell 21. The resistance of photocell 21 then decreases in accordance with the curve illustrated in FIG. 4 thereby causing Schmitt trigger 31 to be energized. The output of Schmitt trigger 31 gates lamp driver 35 so that lamp 37 is energized and, at the same time, energizes overcharge rejection circuit 33. As before, the overcharge rejection circuit generates a signal which either nulls or reverses the input current to the coulometer depending on whether it is desired to have the lamp 37 constantly energized or alternately energized to create a flashing effect.

Plug 39, in addition to reversing the conduction of current through the coulometer, can also be advantageously utilized to varying the integrating interval and/or the relative effect of the outputs of the transducers on the integrating interval. This is accomplished by varying the values of the weighting resistors $R_1-R_4$. As an example, assume that the operational use of a vehicle is being measured. Typically, when the vehicle is initially broken in, there is a need for more frequent servicing than is ordinarily required. Thus, the values of the resistors of the first plug 29 are made smaller than the corresponding resistances of the second plug 39. Assuming a constant level of use of the vehicle, the lower resistances of the resistors of plug 29 will reduce the first integrating interval since current will be conducted through the coulometer during the first interval at higher levels than during the second interval. Since the vehicle is to be serviced at the completion of each integrating interval, the car will initially be serviced after a relatively short operational use period. Then, as the resistances of resistors $R_1-R_4$ are progressively increased from plug to plug, the operational use intervals, before servicing is required, become progressively longer. It can be seen that each successive integrating interval can be appropriately programmed according to engineering specifications such that servicing of the vehicle is performed after an optimum operational use of the vehicle. By suitably coding the plugs, the operator of the vehicle will know which cycle or integrating interval the vehicle is operating in and will know which plug will replace the previous plug as the plugs are sequentially connected to the integrator 10.

It may be desired to vary the effect that a particular subassembly being monitored has on the integrating interval. For example, if the effect of engine block temperature on a vehicle's condition becomes decreasingly important with total vehicle use, then the value of resistor $R_1$ which weights the output of the engine block temperature transducer $e_1$ is increased. The output of transducer $e_1$, therefore, will have a reduced effect on the integrating interval.

It can be seen that by the use of a coulometer integrator and programmable plug, the flexibility in measuring the level of use of an apparatus is greatly enhanced. Not only can a plurality of different subassemblies in an apparatus be simultaneously monitored, but also the relative influence of the measured level of use of each such subassembly on the total composite measured use of the apparatus can be appropriately tailored to engineering criteria. The use of a coulometer for performing the integration function permits the use of the programmable integrator of this invention in conjunction with transducers that generate very low power outputs. In addition to being capable of operating at low power input levels, coulometers are very rugged and, accordingly, the programmable integrator of this invention can be utilized to measure the use of machinery which operate in high vibrational environments.

Refer now to FIG. 3, which is a schematic diagram of the programmable integrator of this invention having a simplified overcharge rejection circuit for maintaining the position of the electrolytic gap of the coulometer adjacent a photocell at the end of an integrating interval. A plurality of sources of signal voltages $e_1-e_4$ are shown connected to a programmable plug 49 through terminals H-K. The signals are appropriately weighted by resistors $R_1-R_4$, summed and the resulting current conducted through coulometer 11 via terminal F of the plug. The current is then conducted to ground through resistor 43. When the electrolytic gap becomes positioned adjacent photocell 19, the resistance thereof is substantially reduced thereby effectively connecting the power supply source $V_c$ to the overcharge rejection circuit 45 via terminals E and C. The output terminal of the circuit 45 is connected to the electrode 13 of the coulometer 11 via terminals G and B. For the overcharge rejection circuit to prevent the conduction of current through the coulometer, the output thereof must be equal to or greater than the maximum signal voltage at the input electrode 15 of the coulometer 11. Hence, with a knowledge of the outputs generated by the transducers $e_1-e_4$, circuit 45 can be made to generate an output that will prevent current flow through the coulometer. The circuit 45 can be of any suitable type, such as a bistable multivibrator.

At the end of an integrating interval, the plug 49 can be removed and replaced by another which is wired such that current is conducted from the transducers $e_1-e_4$ through the coulometer from electrode 13 to electrode 15. The second plug (not shown) connects the output of photocell 21 to the overcharge rejection circuit 45 through terminals C and D.

As an alternate embodiment, the integrator circuit 10 may be mounted on an integrated circuit board 40 as shown in FIGS. 5 and 6. A coulometer 11 is shown secured to the integrated circuit by means of leads 42 and 43 which extend from the electrodes of the coulometer to the circuit board 40 such that the coulometer is raised from the board. Light from a source of light 24 which may preferably be a light emitting diode is directed toward the coulometer and is reflected from the liquid metal therein toward the light sensing elements 26 and 28 which are preferably photodiodes or phototransistors. Light directed toward the electrolytic gap 30 is not reflected and, therefore, passes into space as indicated by line 32.

When the gap 30 becomes positioned in a plane with the light emitting diode 24 and one of the photodiodes 26 or 28, light no longer is reflected onto the diode. When this occurs, the impedance of the photodiode changes substantially. The change in impedance of the photodiode can be utilized to drive an output indicating circuit (not shown).

While the invention has been described in connection with a preferred embodiment, it is not intended to limit the invention to the particular form set forth, but on the contrary, it is intended to cover such alternatives, modifications and equivalents as may be included within the spirit and scope of the invention as defined by the appended claims.

We claim:

1. A programmable integrator comprising
   an integrator including a coulometer having a bored tube, a pair of columns of electrolytically platable metal positioned in the bore of said tube, said columns being separated by a gap filled with an electrolyte, and a pair of electrodes at each end of said tube in contact with said metal columns,
   at least one signal generating means, and
   programmable means for connecting said signal generating means to said coulometer comprising a plurality of interconnector means, said interconnector means being sequentially connected to said signal generating means and to said coulometer to conduct said signals from said signal generating means to said coulometer during an integrating interval, alternate ones of said interconnection means connecting said signal generating means to alternate terminals of said coulometer to thereby reverse current flow through said coulometer.

2. The programmable integrator of claim 1 wherein said programmable means includes means for weighting the signals generated by a plurality of said signal generating means, said weighting means adjusting the relative contribution of each of said signal generating means to the total signal conducted through said coulometer.

3. The programmable integrator of claim 2 further comprising means for indicating the completion of an integrating interval.

4. The programmable integrator of claim 1 wherein said indicating means is a lamp.

5. The programmable integrator of claim 4 further comprising means for flashing said lamp at the completion of an integrating interval.

6. The programmable integrator of claim 1 further comprising a source of light positioned on one side of said tube and a pair of light sensitive means positioned on the side of said tube and spaced apart from one another along the longitudinal axis of said tube, said integrating interval being completed when the position of said gap alters the light being received from said light source at one of said light sensitive means.

7. The programmable integrator of claim 6 further comprising means for inhibiting the movement of said electrolytic gap past said light sensitive means at the end of an integrating interval.

8. A programmable integrator for measuring the use of an apparatus comprising at least one means for generating an electrical signal which is a function of the use of at least one portion of said apparatus integrator means responsive to said electrical signals for providing an output proportional to the integral of the sum of said signals, said integral representing the use of said apparatus, programmable means for connecting said signal generating means to said integrator means, said programmable means comprising a plurality of replaceable interconnection circuits for connecting said signal generating means to said integrator means, said circuits being sequentially applied to said integrator means and said signal generating means upon the completion of each integrating interval such that alternate circuits connect said signal generating means to opposite terminals of said integrator means thereby resetting said integrator means at the beginning of each integrating interval, and means for indicating the completion of an integrating interval.

9. The programmable integrator of claim 8 wherein said integrator means includes a coulometer, said coulometer including a bored tube, a pair of columns of electrolytically platable metal positioned in the bore of said tube, said columns being separated by a gap filled with an electrolyte, and a pair of electrodes at each end of said tube in contact with said metal columns, a source of radiation positioned to one side of said tube, a pair of radiation sensitive means positioned on the side of said tube opposite said radiation source, said radiation sensitive means being spaced from one another along the longitudinal axis of said tube and being responsive to the alignment of said electrolytic gap between said radiation source and said radiation sensitive means to generate a change in signal output thereof.

10. The programmable integrator of claim 11 wherein said radiation source is a source of light and said radiation sensitive means are light sensitive variable impedances.

11. The programmable integrator of claim 12 wherein said replaceable circuits are each mounted in a plug, said plug being removably connected between said integrator means and said signal generating means.

12. The programmable integrator of claim 8 wherein said programmable integrator comprises a plurality of means for generating an electrical signal which is the function of the use of a portion of said apparatus and the programmable means further comprises means for weighting the contribution of each of said generated signals to the total signal conducted through said integrator means.

13. The programmable integrator of claim 12 wherein said weighting means comprises a plurality of impedances each of said impedances being connected to one of said signal generating means at one end and to said coulometer at the other end, said impedances limiting the current generated by said signal generating means.

14. A programmable integrator for measuring the use an apparatus comprising a plurality of means for generating an electrical signal which is a function of the use of a portion of said apparatus, integrator means responsive to said electrical signals for providing an output proportional to the integral of the sum of said signals, said integral representing the use of said apparatus, and programmable means for connecting said signal generating means to said integrator means, said programmable means comprising a plurality of replaceable interconnection circuits for connecting said signal generating means to said integrator means, said circuits including means for according different weights to the contribution of each of said generated signals to the total signal conducted through said integrator means, said circuits being sequentially applied to said integrator means and said signal generating means to vary the effect of said generated signals on the total signal conducted through said integrator means.

* * * * *

PO-1050
(5/69)

UNITED STATES PATENT OFFICE
CERTIFICATE OF CORRECTION

Patent No. 3,777,266      Dated December 4, 1973

Inventor(s) Edward M. Marwell and Eugene P. Finger

It is certified that error appears in the above-identified patent and that said Letters Patent are hereby corrected as shown below:

Column 1, line 37, "In order" should read -- In other --.

Column 1, line 60, "INVENTIN" should read -- INVENTION --.

Column 4, line 41, "A current" should read -- As current --.

Column 5, line 15, "$\int dt$" should read -- $\int i dt$ --.

In the claims:

Claim 4 should be dependent on claim 3, not on claim 1.

Claim 10 should be dependent on claim 9, not on claim 11.

Claim 11 should be dependent on claim 8, not on claim 12.

Signed and sealed this 25th day of June 1974.

(SEAL)
Attest:

EDWARD M. FLETCHER, JR.
Attesting Officer

C. MARSHALL DANN
Commissioner of Patents